United States Patent [19]

Povinger

[11] Patent Number: 5,522,369
[45] Date of Patent: Jun. 4, 1996

[54] SYSTEM AND METHOD FOR CONTROLLING DELIVERY OF GASEOUS FUEL TO AN INTERNAL COMBUSTION ENGINE

[75] Inventor: Bela P. Povinger, Grosse Ile, Mich.

[73] Assignee: Ford Motor Company, Dearborn, Mich.

[21] Appl. No.: 494,466

[22] Filed: Jun. 26, 1995

[51] Int. Cl.$^6$ ............................ F02M 21/04; G05D 16/20
[52] U.S. Cl. ........................ 123/527; 123/447; 123/459; 137/12; 137/115.03
[58] Field of Search ...................... 123/525, 527, 123/DIG. 12, 447, 497, 456, 459; 137/12, 115, 116, 116.3, 116.5, 255

[56] References Cited

U.S. PATENT DOCUMENTS

| | | | |
|---|---|---|---|
| Re. 33,270 | 7/1990 | Beck et al. .................. | 123/446 |
| 3,412,718 | 11/1968 | Long . | |
| 3,705,571 | 12/1972 | Horn et al. . | |
| 4,064,855 | 12/1977 | Johnson ...................... | 123/467 |
| 4,570,578 | 2/1986 | Peschka et al. . | |
| 4,615,320 | 10/1986 | Fehrenbach et al. . | |
| 4,742,801 | 5/1988 | Kelgard . | |
| 5,275,145 | 1/1994 | Tuckey ...................... | 123/525 |
| 5,351,726 | 10/1994 | Diggins . | |
| 5,355,854 | 10/1994 | Aubee ...................... | 123/527 |
| 5,367,999 | 11/1994 | King et al. ............... | 123/527 |
| 5,377,645 | 1/1995 | Moore ...................... | 123/525 |
| 5,390,646 | 2/1995 | Swenson ...................... | 123/525 |
| 5,398,655 | 3/1995 | Tuckey ...................... | 123/456 |

FOREIGN PATENT DOCUMENTS

| | | | |
|---|---|---|---|
| 56-92336 | 7/1981 | Japan ...................... | 123/527 |

*Primary Examiner*—Erick R. Solis
*Attorney, Agent, or Firm*—Paul K. Godwin, Jr.; Roger L. May

[57] ABSTRACT

A fuel delivery system which includes a source of pressurized fuel (18–22), at least one fuel injector (14) in fluid communication with the source (18–22), a pressure regulator (34) for delivering the pressurized fuel to the fuel injector (14), a pressure sensor (40) for providing an indication of pressure at the fuel injector (14), a controller (42) responsive to the pressure sensor (40) for providing a pressure release signal, and a pressure release system (44) responsive to the pressure relief signal for diverting a portion of the pressurized fuel from the fuel injector (14).

12 Claims, 4 Drawing Sheets

5,522,369

SYSTEM AND METHOD FOR CONTROLLING DELIVERY OF GASEOUS FUEL TO AN INTERNAL COMBUSTION ENGINE

BACKGROUND OF THE INVENTION

The invention relates generally to fuel delivery systems, and more particularly to a method and system for controlling delivery of gaseous fuel to an internal combustion engine.

Alternative gaseous fuels, such as compressed natural gas ("CNG"), for use in internal combustion engines are generally known. A common characteristic of these gaseous fuels is that in comparison to gasoline a much greater volume is required to store an amount of energy necessary to obtain an equivalent range of travel. In order to obtain a range of travel comparable to gasoline without exceeding the space available for fuel storage, natural gas is typically compressed to pressures as high as 3600 psig or even higher.

Typical solenoid operated fuel injectors cannot be opened once the pressure exerted on the valve needle by the fuel exceeds the maximum electromotive force which can be generated to pull the valve needle away from the valve seat, typically 150 psig. Accordingly, most CNG fuel delivery systems provide a pressure regulator to reduce the CNG stored pressure to an operating pressure of around 90–115 psig.

When the pressure exerted by the fuel on the fuel injector needle exceeds the maximum electromotive force developed at the valve needle, the excess pressure should be relieved. Numerous federal regulations, however, prohibit the release of CNG into the atmosphere above certain volumes. Accordingly, a need exists for a method and system of controlling delivery of gaseous fuel to an internal combustion engine which provides a means for relieving pressure at the fuel injectors without introducing the gaseous fuel into the atmosphere.

SUMMARY OF THE INVENTION

An object of the invention herein is to control the delivery of gaseous fuel to an internal combustion engine. A further object is to provide a means for relieving excess pressure without introducing CNG into the atmosphere. The above objects are achieved by a method of fuel delivery which comprises the steps of delivering a flow of pressurized fuel to at least one fuel injector from a source of pressurized fuel, providing an indication of pressure at the fuel injector, and diverting a portion of the pressurized fuel from the injector when the indication of pressure exceeds an upper limit. Such a method may be used to advantage in a fuel delivery system which includes a source of pressurized fuel, at least one fuel injector in fluid communication with the source, a pressure regulator for delivering the pressurized fuel to the fuel injector, a pressure sensor for providing an indication of pressure at the fuel injector, a controller responsive to the pressure sensor for providing a pressure release signal, and a pressure release system responsive to the pressure relief signal for diverting a portion of the pressurized fuel from the fuel injector.

An advantage of the present invention is that excess fuel pressure is relieved from the fuel injector. Preferably another advantage of not introducing gaseous fuel into the atmosphere is obtained by accumulating the diverted portion of pressurized fuel and returning the accumulated portion to the fuel injector for combustion.

BRIEF DESCRIPTION OF THE DRAWINGS

The above objects and advantages of the invention will be more clearly understood by reading the following description of an exemplary embodiment in which the invention is used to advantage with reference to the attached drawings wherein.

DETAILED DESCRIPTION OF THE PREFERRED EMBODIMENT

Figure 1:
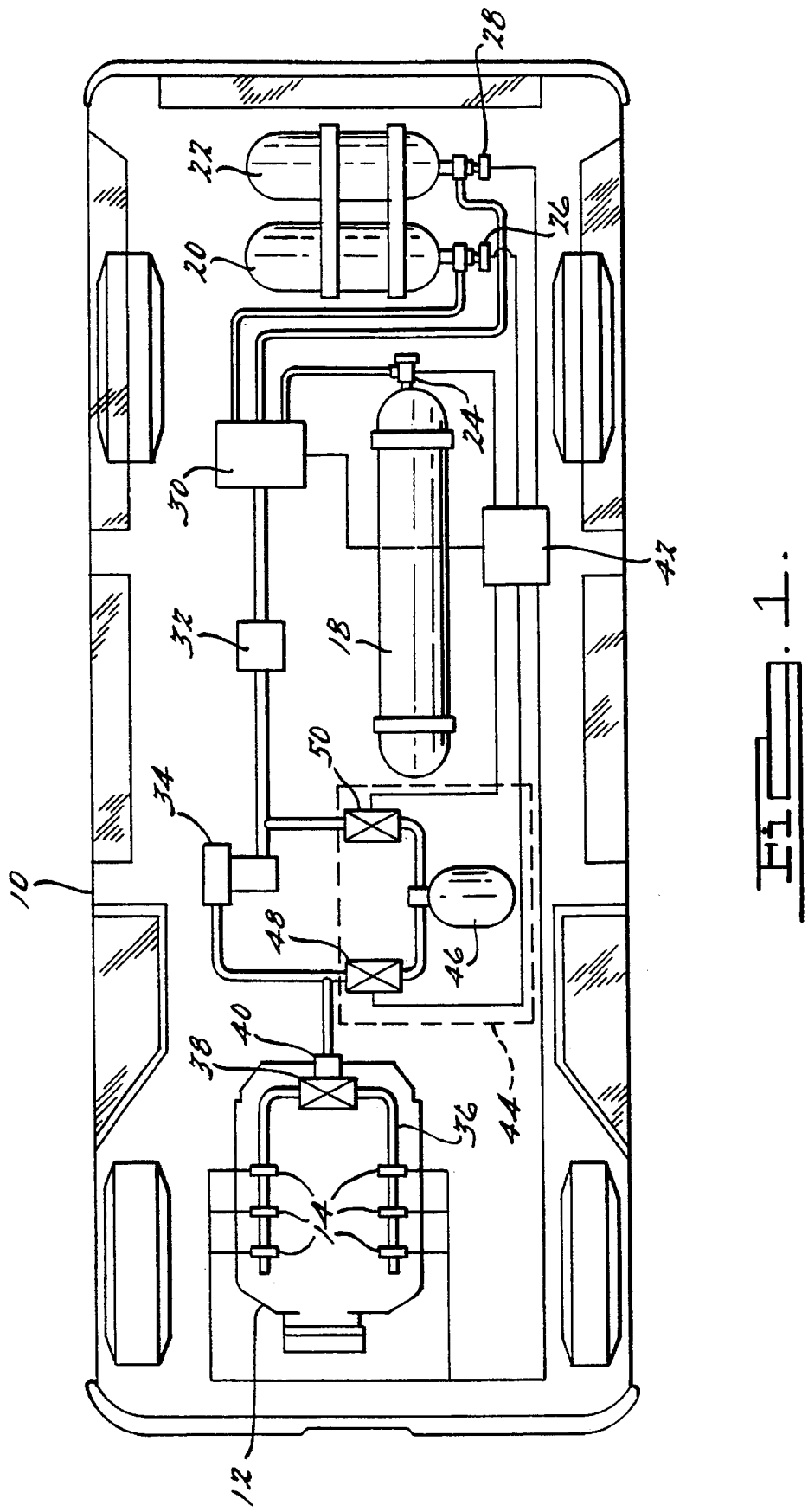
FIG. 1 is a block diagram of the system in which the invention is used to advantage.

Referring first to FIG. 1, vehicle 10 is shown including an internal combustion engine 12 which burns a gaseous fuel such as compressed natural gas ("CNG"). Fuel is delivered to fuel injectors 14 from fuel tanks 18, 20, and 22 through the various components described herein. Fuel tanks 18, 20, and 22 store the CNG under pressures which may reach as high as 3600 psig or higher when full. Flow out of each tank is controlled by electronically controlled solenoid valves such as supply valves 24, 26, and 28 which are located on fuel tanks 18, 20, and 22, respectively. Preferably, an additional electronically controlled solenoid valve such as high pressure ("HP") valve 30 is included at a nodal point to provide single point control out of the supply tanks.

In the embodiment shown in FIG. 1, the fuel supply is divided into three fuel tanks for storage convenience. Obviously fewer or more tanks could be used depending on packaging constraints and the desired range of travel for the vehicle. Similarly, six fuel injectors are shown coupled to the engine in FIG. 1. One skilled in the art will recognize that the number of fuel injectors could be increased or decreased depending on the number of cylinders and the placement of the fuel injectors in the intake manifold.

When HP valve 30 and supply valves 24, 26, and 28 are open, pressurized fuel flows through filter 32, which removes contaminants and water from the fuel, to pressure regulator 34. Under normal operating conditions, pressure regulator 34 reduces the supply pressure of the fuel to a nominal operating pressure of a preselected value normally within the range of 90–115 psig. The pressurized fuel is then delivered to fuel injectors 14 via fuel rail 36. Preferably, an electronically controlled solenoid valve such as fuel rail shut-off valve 38, which is responsive to a pressure sensor, such as fuel rail pressure sensor 40, are fluidly interposed between pressure regulator 34 and fuel rail 36 as shown in FIG. 1. In the presently described embodiment, fuel rail pressure sensor 40 generates a voltage which corresponds to an indication of pressure of the pressurized fuel at the fuel rail.

Controller 42 includes a microcomputer which generates supply control signals which electronically actuate the solenoids of supply valves 24, 26, and 28 and HP valve 30 in a conventional current driver manner. As shown in FIG. 1, controller 42 also provides signals for controlling the opening and closing of fuel injectors 14 in a known manner. And, as will be described in greater detail later herein, controller 42 also provides a pressure relief signal and a pressure control signal under certain operating conditions in response to fuel rail pressure sensor 40.

Finally, pressure relief system 44, as illustrated in FIG. 1, is responsive to the pressure relief signal and the pressure control signal generated by controller 42 for diverting a portion of the pressurized fuel away from fuel rail 36 during specific operating conditions. In the embodiment shown in FIG. 1, pressure relief system 44 includes an accumulator, such as auxiliary tank 46, which is fluidly coupled between pressure regulator 34 and fuel rail 36 via a one-way electronically controlled solenoid valve such as inlet valve 48. A path is thereby provided for diverting a portion of the pressurized fuel away from the fuel rail into auxiliary tank 46. Preferably, auxiliary tank 46 remains at ambient pressure when empty. Additionally, sizing of auxiliary tank 46 will depend upon the volume of gaseous fuel which needs to be diverted.

A second one-way electronically controlled solenoid valve shown in FIG. 1 as outlet valve 50 provides a return path for recirculating the accumulated fuel to fuel injectors 14. Controller 42 electronically controls the openings and closings of inlet valve 48 and outlet valve 50 as will be described in greater detail later herein.

It is important to note that the configuration of the diversion and return paths provided by inlet valve 48 and outlet valve 50, as shown in FIG. 1, is not intended to be limiting. Rather, the specific placement of the valves is to some extent a matter of design choice. For example, while inlet valve 48 is shown fluidly interposed between pressure regulator 34 and fuel rail pressure sensor 40, it could also be directly coupled to the fuel rail. Similarly, outlet valve 50 could be placed downstream from pressure regulator 34. Other configurations which do not depart from the spirit and scope of the present invention are also likely to arise in the minds of those skilled in the art.

Figure 2A:
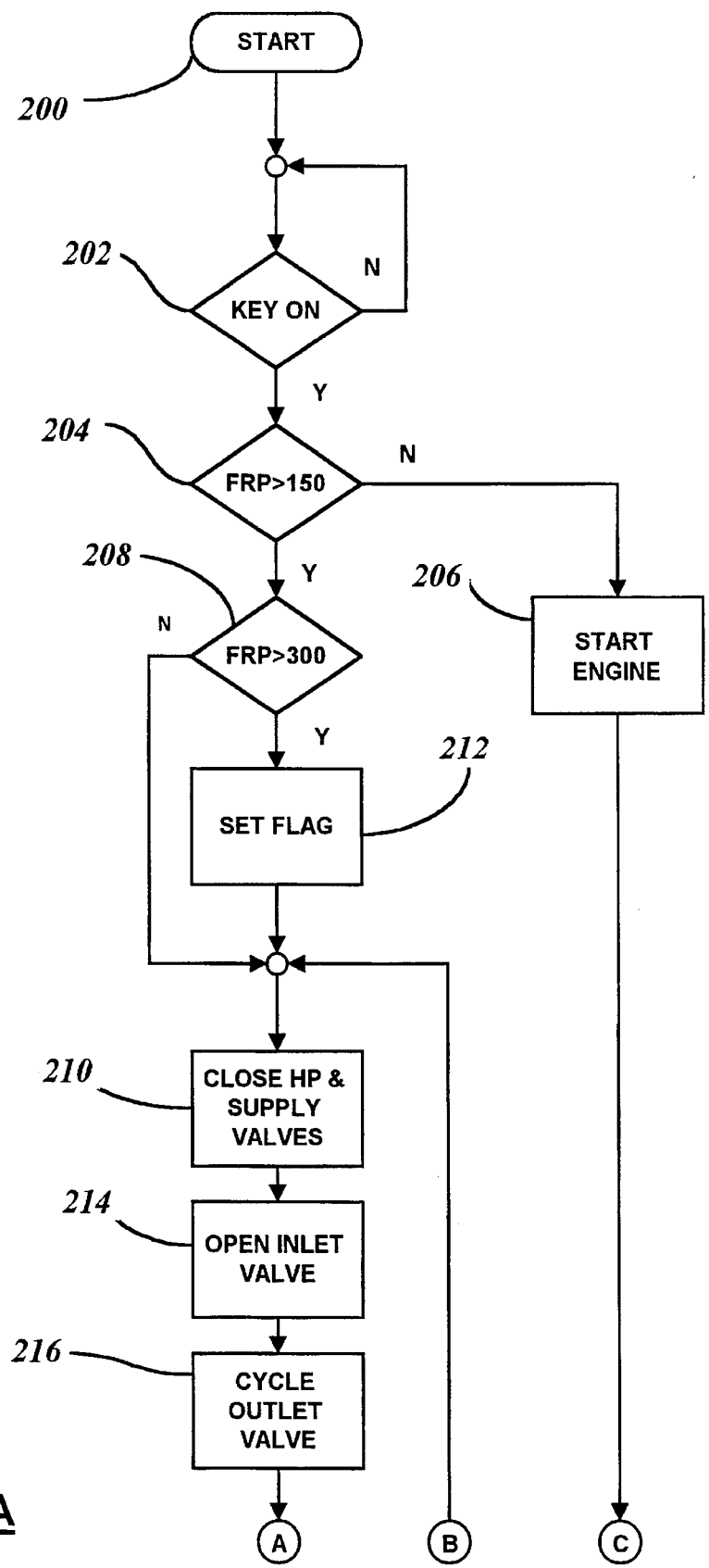
FIGS. 2A, 2B, and 3 are flowcharts illustrating various process steps performed by a portion of the embodiment shown in FIG. 1.
Figure 2B:
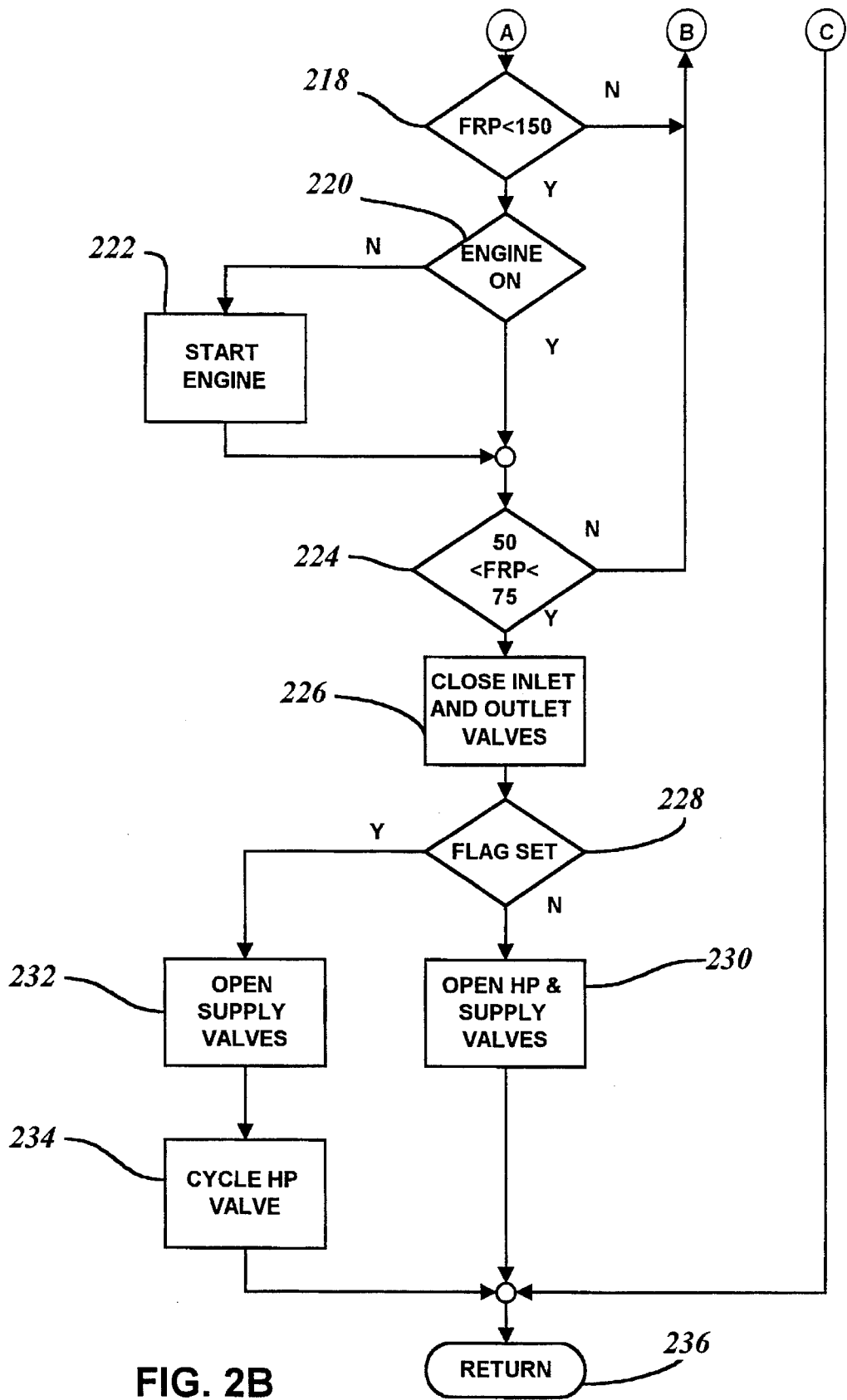

Having described the various components of an embodiment of the invention and their interconnections, the operation of controller 42 in controlling the various valves in response to the pressure indication during engine start-up will now be described with particular reference to FIG. 2.

At the start (step 200), a determination is made whether engine start-up is requested by monitoring the key-on position of a typical ignition switch (not shown in FIG. 1). If the key is not in the on position, then the monitoring continues until such time as start-up is requested. Once start-up is requested, controller 42 monitors fuel rail pressure sensor 40 to determine whether the pressure at fuel rail 36 (FRP) exceeds an upper limit. Preferably this upper limit corresponds to the maximum equivalent pressure which can be generated by the electromotive force at the fuel injector to open the needle valve, such as 150 psig in this example. When the indication of pressure is below this limit (step 204), controller 42 executes a normal engine start strategy (step 206). At this point controller 42 enters an engine running operating mode which will be described in greater detail below with particular reference to FIG. 3.

Alternatively, when the pressure indication exceeds 150 psig at step 204, a determination is made whether the pressure indication exceeds a second predetermined threshold (step 208). Preferably, the second threshold corresponds to a pressure value above the nominal pressure build-up which may be expected at fuel rail 36 during the engine off period due to temperature variations or pressure creep. For illustrative purposes in the present embodiment this second threshold is set at 300 psig.

Continuing with FIG. 2, when the pressure indication is below 300 psig, controller 42 closes HP valve 30 and supply valves 24, 26, and 28 to prevent a flow of pressurized fuel out of fuel tanks 18, 20, and 22.

However, when the fuel rail pressure exceeds 300 psig, controller 42 sets a flag in step 212, whose purpose will be described later herein, prior to closing HP valve and supply valves 24, 26, and 28 in step 210.

In order to relieve the excess pressure at fuel rail 36 and to facilitate engine start-up, controller 42 generates a pressure relief signal which opens inlet valve 48 and thereby provides a path for diverting a portion of the pressurized fuel into accumulator 46 (step 214). Preferably, controller 42 also generates a pressure control signal for cycling outlet valve 50 which allows the accumulated pressurized fuel to be reintroduced to fuel rail 36 at a reduced pressure. Steps 210 through 216 repeat until the indication of pressure is less than or equal to 150 psig (step 218). Once the pressure is below the 150 psig threshold, controller 42 executes the normal engine start strategy when the engine is not currently running (steps 220 and 222).

In order to utilize as much of the accumulated portion of the fuel as possible, controller 42 continues to cycle outlet valve 50 (steps 210–222) until the pressure indication is within a predetermined range, for example between 50 and 75 psig (step 224). Once the pressure is reduced to within the desired range (step 224), controller 42 closes both inlet 48 and outlet valve 50 at step 226.

During step 228, a determination is made whether the flag was set during step 212. When the flag is not set (step 228), controller 42 opens HP valve 30 and supply valves 24, 26, and 28 (step 230). However, when the flag has been set (step 228), controller 42 opens supply valves 24, 26, and 28 (step 232) and cycles HP valve 30 (step 234) to maintain an average pressure at fuel injectors 14 within the desired operating pressure range.

Figure 3:
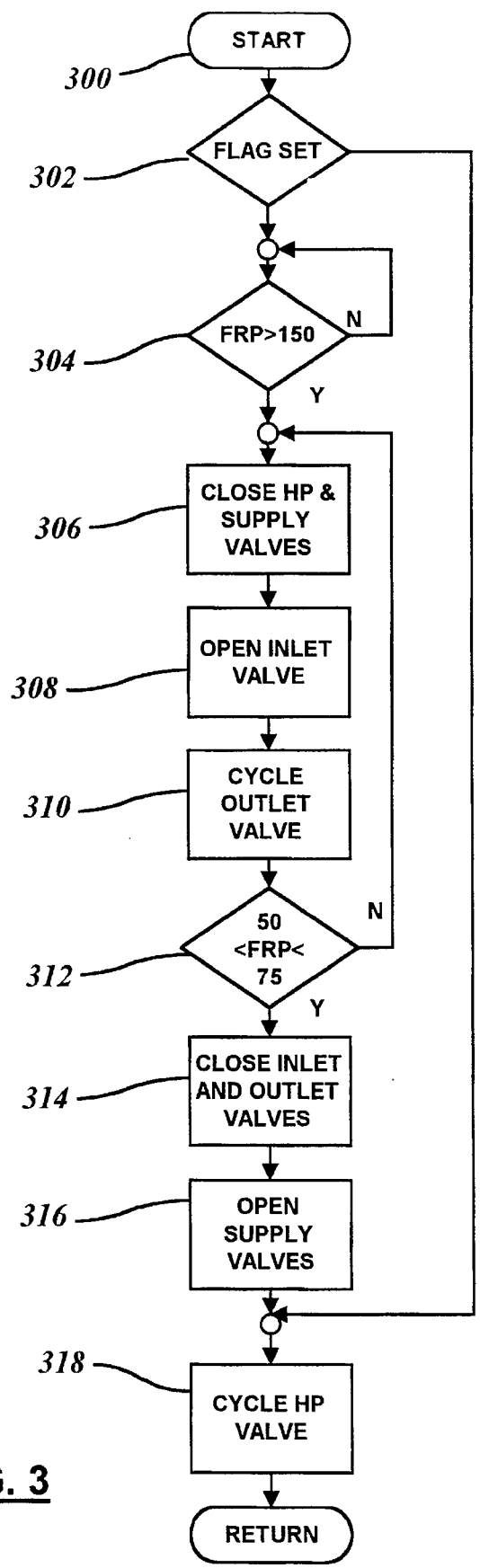

Once the engine start-up routine is complete, controller 42 returns (step 236) to an engine run strategy which will now be described with particular reference to FIG. 3.

At the start (step 300), a determination is made in step 302 whether the flag was set during the engine start-up routine (see step 212). When the flag is not set, controller 42 continually monitors the fuel rail pressure to determine whether the pressure exceeds 150 psig (step 304). Should the pressure exceed 150 psig, controller 42 will initially close HP valve 30 and supply valves 24, 26, and 28 (step 306). Similar to the operations in steps 214–224 as described above in the engine start-up routine, controller 42 then opens inlet valve 48 (step 308) and cycles outlet valve 50 (step 310) until the pressure indication indicates that the accumulated portion is almost used up (step 312).

Also, similar to steps 224–234, when the flag has been set at step 212 during the start-up routine, controller 42 closes inlet valve 48 and outlet valve 50 (step 314), opens supply valves 24, 26, and 28 (step 316), and controls HP valve 30 in step 318 such as in this example by cycling HP valve 30 so that the pressure at fuel rail 36 is maintained within the desired operating range.

If however a determination is made at step 302 that the flag was previously set during start-up, controller 42 will continue to cycle HP valve 30 in step 318 as described above.

This concludes the description of an embodiment in which the invention claimed herein is used to advantage. Those skilled in the art will bring to mind many modifications and alterations to the example present herein without departing from the spirit and scope of the invention. For example, while the pressure relief system illustrated in FIG. 1 shows inlet valve 48 interposed between pressure regulator 34 and fuel rail pressure sensor 40 and outlet valve 50 fluidly interposed between filter 32 and pressure regulator 34, the exact configuration implemented is more a matter of design choice then necessity. Furthermore, while the present embodiment has been described as steps performed by a microprocessor in controller 42, the present invention may also be used to advantage using any number of combination of digital and analog devices commonly known in the art. Accordingly, it is intended that the scope of the invention be limited to only the following claims.

What is claimed:

1. A gaseous fuel delivery system for an engine comprising:
    a source of pressurized gaseous fuel at a first positive pressure within a first pressure range;
    at least one fuel injector in fluid communication with said source;
    a pressure regulator for delivering said pressurized gaseous fuel to said fuel injector at a second positive pressure within a second pressure range, said second positive pressure being less than said first positive pressure;
    a pressure sensor for providing an indication of pressure of said pressurized gaseous fuel at said fuel injector;
    a controller responsive to said pressure sensor for providing a pressure relief signal; and
    a pressure relief system responsive to said pressure relief signal for diverting a portion of said pressurized gaseous fuel from said fuel injector to a fuel flow path which is in parallel to said regulator.

2. A gaseous fuel delivery system according to claim 1 wherein said controller provides a supply control signal for controlling the flow of pressurized gaseous fuel from said source of pressurized gaseous fuel.

3. A fuel delivery system according to claim 2 wherein said source of pressurized gaseous fuel includes a tank for storing gaseous fuel under pressure and a supply valve responsive to said supply control signal.

4. A fuel delivery system according to claim 1 wherein said pressure relief system includes an accumulator separate from said source of pressurized gaseous fuel, said accumulator fluidly coupled to said fuel injector via a first control valve responsive to said pressure relief signal.

5. A gaseous fuel delivery system according to claim 4 wherein said controller provides a pressure control signal and said pressure relief system further includes a second control valve responsive to said pressure control signal fluidly coupling said accumulator to said fuel injector.

6. A method of delivering gaseous fuel to an engine comprising the steps of:
    delivering a flow of pressurized gaseous fuel at a first pressure within a first pressure range to at least one fuel injector from a source of pressurized gaseous fuel at a second pressure within a second pressure range, said first pressure being lower than said second pressure;
    providing an indication of pressure of said pressurized gaseous fuel at said fuel injector; and
    diverting a portion of said pressurized gaseous fuel from said fuel injector to a fuel path which is in parallel to a pressure regulator, when said indication of pressure exceeds an upper limit.

7. A method according to claim 6 further comprising the step of accumulating said portion of said pressurized gaseous fuel in an accumulator separate from said source of pressurized gaseous fuel.

8. A method according to claim 7 further comprising the step of returning said accumulated portion of said pressurized gaseous fuel to said fuel injector.

9. A method according to claim 6 wherein said flow of pressurized gaseous fuel is prevented from said source during said step of diverting a portion of pressurized gaseous fuel away from said fuel injector.

10. A method of fuel injection comprising the steps of:
    delivering pressurized gaseous fuel at a first pressure within a first pressure range to at least one fuel injector from a source of pressurized gaseous fuel at a second pressure within a second pressure range, said first pressure being less than said second pressure;
    providing an indication of pressure at said fuel injector;
    generating a pressure relief signal when said indication of pressure exceeds an upper limit;
    diverting a portion of said pressurized gaseous fuel to an accumulator via a first control valve responsive to said pressure relief signal;
    generating a pressure control signal when said indication of pressure exceeds said upper limit; and
    returning said portion of said pressurized gaseous fuel to said fuel injector via a second control valve responsive to said pressure control signal.

11. A method according to claim 1 further comprising the step of preventing delivery of said pressurized gaseous fuel from said source of pressurized gaseous fuel when said indication of pressure exceeds said upper limit.

12. A method according to claim 1 further comprising the step of restoring delivery of said pressurized fuel from said source of pressurized gaseous fuel when said indication of pressure reaches a predetermined value.

\* \* \* \* \*